(12) United States Patent
Bergvinson

(10) Patent No.: US 12,350,694 B2
(45) Date of Patent: Jul. 8, 2025

(54) SYSTEM FOR APPLYING A FLUID TO A CHAIN OR CABLE

(71) Applicant: Erik Ernest Bergvinson, West Vancouver (CA)

(72) Inventor: Erik Ernest Bergvinson, West Vancouver (CA)

( * ) Notice: Subject to any disclaimer, the term of this patent is extended or adjusted under 35 U.S.C. 154(b) by 409 days.

(21) Appl. No.: 17/625,044

(22) PCT Filed: May 6, 2020

(86) PCT No.: PCT/CA2020/050612
§ 371 (c)(1),
(2) Date: Jan. 5, 2022

(87) PCT Pub. No.: WO2021/003555
PCT Pub. Date: Jan. 14, 2021

(65) Prior Publication Data
US 2022/0288619 A1    Sep. 15, 2022

(30) Foreign Application Priority Data
Jul. 11, 2019  (CA) ..................................... 3049054

(51) Int. Cl.
| | |
|---|---|
| *B05B 14/00* | (2018.01) |
| *B05B 13/02* | (2006.01) |
| *B05D 1/02* | (2006.01) |
| *B05D 3/12* | (2006.01) |
| *B05D 7/14* | (2006.01) |
| *B05D 7/20* | (2006.01) |
| *B63B 21/20* | (2006.01) |

(52) U.S. Cl.
CPC .......... *B05B 14/00* (2018.02); *B05B 13/0214* (2013.01); *B05D 1/02* (2013.01); *B05D 3/12* (2013.01); *B05D 7/14* (2013.01); *B05D 7/20* (2013.01); *B63B 21/20* (2013.01); *B63B 2021/203* (2013.01)

(58) Field of Classification Search
None
See application file for complete search history.

(56) References Cited

U.S. PATENT DOCUMENTS

| | | | |
|---|---|---|---|
| 4,242,977 | A | 1/1981 | Long |
| 2014/0213399 | A1 | 7/2014 | Varghese et al. |

FOREIGN PATENT DOCUMENTS

| | | | |
|---|---|---|---|
| JP | 5800948 | B1 | 10/2015 |
| KR | 20170034582 | A * | 3/2017 |
| WO | WO-8707534 | A1 * | 12/1987 |

\* cited by examiner

*Primary Examiner* — Michael P. Rodriguez

(57) ABSTRACT

The present invention provides a system for applying an anti-corrosion fluid to an anchor chain or cable. The system may include at least one set of nozzles disposed on the inner periphery of a conduit. Furthermore, at least one flap may be disposed on the inner periphery of a conduit, below the nozzles, for catching and smearing the fluid on the cable. Additionally, the invention may contain a reducer, attached to the bottom of the conduit, that may contain a flap, for catching the excess fluid and smearing the fluid on the cable.

19 Claims, 3 Drawing Sheets

SYSTEM FOR APPLYING A FLUID TO A CHAIN OR CABLE

CROSS-REFERENCE TO RELATED APPLICATIONS

This application is a national stage application filed under 35 U.S.C. § 371 of International Patent Application No. PCT/CA2020/050612, filed on May 6, 2020, which is incorporated by reference herein in its entirety for all purposes.

FIELD

This invention is in the field of applying a fluid, and more specifically for applying a fluid to a chain or cable. Even more particularly, the invention is in the field of applying an anti-corrosion fluid to an anchor chain or cable.

BACKGROUND

Anchor chains and cables are commonly used in a marine environment, across a variety of industries, such as marine transport, oil and gas, and alternative energy off-shore windmills. Within these marine industries, anchor chains and cables are typically a part of cycles and boats and ships have a system to apply a fluid on the cable that eases mobility or washes the cable. For example, JP 5800948 to Shin Kurshima Dockyard and filed on Apr. 21, 2014 describes an anchor chain washing nozzle structure of a cleaning device including a hose pipe for an anchor chain to pass through where water is ejected from jets of nozzles to wash the anchor chain.

U.S. Pat. No. 4,242,977 to George W. Long and filed on Apr. 20, 1978 discloses an elongated tube slidable axially inside a collar hinged to a bracket attached to a boat deck. A boat anchor is secured to an anchor line which passes through the tube.

US Pat. Pub. No. 2014/0213399 to 3M Innovative Properties Company and filed on Aug. 28, 2012 discloses a device for sequential cleaning and lubricating a drive chain of a motorcycle, comprising a housing into which the chain is enclosed. Nozzles are arranged within each compartment of the housing and placed radially inwards onto the chain to supply medium onto the chain. Brushes are attached in the interior of at least one of the compartments of the housing in such a way that bristles of the brushes are positioned towards and in contact with the chain.

SUMMARY

The present invention provides a system for applying an anti-corrosion fluid to an anchor chain or cable. The system may include a reservoir, container, pump and tube for pumping the fluid for the chain. The system may further include at least one set of nozzles, wherein each set of the at least one set of nozzles includes at least a first and second nozzle disposed on an inner periphery of the conduit for applying the fluid to the chain. Furthermore, at least one flap may be disposed between each set of nozzles, wherein the at least one flap may aid in the catchment and smearing of the anti-corrosion fluid. In one aspect, the fluid may include a dielectric, penetrant and lubricating rust inhibitor.

In another aspect, the first arm may be disposed above a spool that holds the cable that unravels from the spool. In another aspect, a reducer that is a coupling decreasing in diameter at one end, may be disposed at the bottom of the conduit. The reducer may contain one or more flaps that may aid in capturing and applying the anti-corrosion lubricant.

In at least another aspect, a second or more set of nozzles and flaps may be disposed on the inner periphery of the conduit.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

Figure 1:
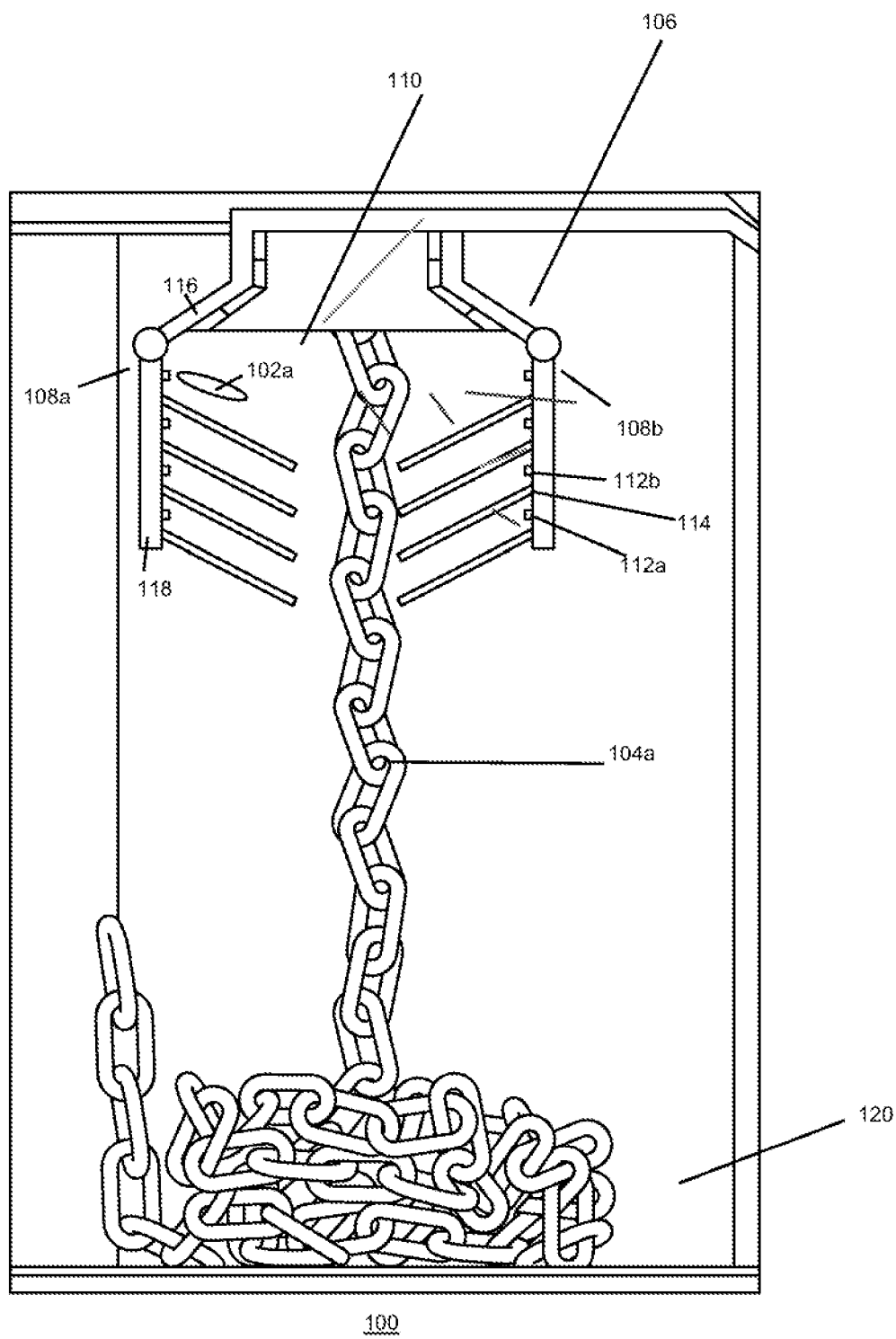
FIG. 1 illustrates one aspect for applying a fluid to a cable.
Figure 2:
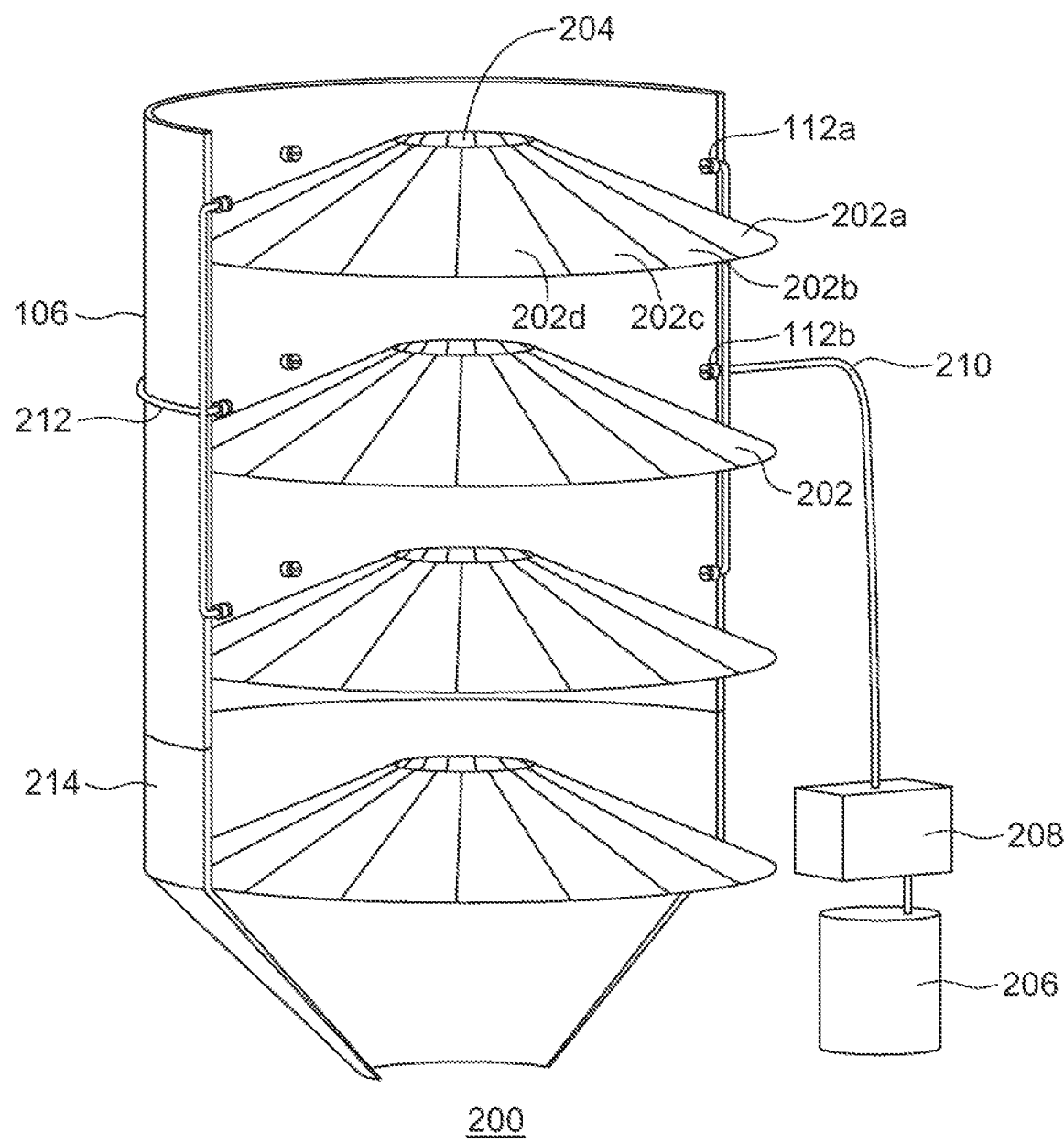
FIG. 2 is an alternative aspect of applying a fluid to a cable.

Current systems for applying a fluid to the chain or cable apply a washer fluid or a lubricant, and the cables or chains rust over time requiring repair or replacement of the cable or chain. In some instances, the cable or chain may be prone to breaking if suitable maintenance is not performed thereby creating a hazardous environment. With reference to FIGS. 1-2, a system 100 for applying a fluid 102a to a cable or chain 104a and 104b respectively, is described herein.

The system 100 in FIG. 1, may include a conduit 106, a chain 104a, and a fluid 102a. The conduit 106 may comprise one or more walls and a closed end. The conduit 106 may comprise an opening located proximate to the top of conduit 106 for receiving the chain 104a. The conduit 106 may be sized to house the chain 104a. During operation, a fluid 102a may be applied to the chain 104a in the form of a liquid that may be dispensed, aerosolized, and/or sprayed onto the chain 104a. The fluid 102a may include a cleaning fluid, a lubricant, an anti-corrosive, a dielectric, and/or a thick-film, and/or any combination thereof, such as Ship-2-Shore (S2S), but is not limited in scope to these fluids.

As illustrated in FIG. 1, the conduit 106 may be oriented generally vertically in order to receive the chain 104a. One or more arms 108 may extend into the conduit 106 from the opening 110 such that each arm 108 may be suspended inside a volume defined by the conduit 106. In this aspect, the opening 110 may be aligned with an axis of the conduit 106. Each arm 108a may connect to one or more sets of nozzles 112a and/or to one or more flaps 114a. Each arm 108 may provide a housing for the fluid 102a, such that the fluid 102a may pump through each arm 108 and exits through the at least one set of nozzles 112a to be dispensed or sprayed onto the chain 104a.

Each arm 108 may be fixedly or hingedly attached to a top end of the conduit 106 with the nozzles 112a disposed on the inner periphery of each arm 108 and may be directed towards a center of the conduit 106 and towards the chain 104. Each arm 108 may comprise an angled portion 116 extending toward a wall of the conduit 106 followed by an elongate portion 118 extending generally parallel to the wall of the conduit 106. The one or more sets of nozzles 112a may be present on the elongate portion 118 of each arm 108 and may be generally directed towards the central axis of the conduit 106. Each set of nozzles 112 may comprise two or more nozzles for applying the fluid 102a. The one or more flaps 114 may be disposed between each nozzle in the set of nozzles 112 to evenly apply the fluid onto the chain 104 at varied and/or equal pressures. In some aspects, the nozzles 112 may be individually controlled.

FIG. 1 illustrates a first nozzle 112a and a second nozzle 112b for applying the fluid 102a onto the chain 104a, and disposed between each nozzle in a set of nozzles 112 is the at least one flap 114. In this aspect, the flap 114 extends from the elongate portion of each arm 118 and generally extends towards the closed end 120 of the conduit 106.

In FIG. 1, a first arm 108a and a second arm 108b of the one or more arms 108 are disposed across and opposite from each other and each arm may have an additional set of nozzles with a flap 114 disposed between each nozzle in the set of nozzles. The second arm 108b may provide a channel for the chain 104a to pass through. The flaps 114 may have a length that may provide stability to the chain passing through while evenly distributing the fluid 102a onto the chain 104a. The at least one flap 114 may be made from a flexible material such as rubber. Although aspects described herein may describe rubber flaps, other aspects may integrate other flexible materials such plastic flaps, or the like. Furthermore, the arms 108, nozzles 112, and flaps 114 may be of varied materials, lengths, shapes, and/or sizes and these varied materials, lengths, shapes, and/or sizes may be dependent on a size of the cable or chain. Example shapes may include tubular and/or prism-shaped arms, nozzles, and flaps however is not limited in scope to only these shapes.

FIG. 2. illustrates another example 200 of applying a fluid. The system 200 of FIG. 2 illustrates a cylindrical conduit 106 (e.g. a spurling pipe) that may comprise a plurality of flaps 202a-d that may provide easy of movement, flexibility and further preventing tearing. The plurality of flaps 202a-d may form a generally conical shape 202 located on the inner periphery of the conduit 106. Each conical shape of flaps 106 may comprise a central orifice 204 for guiding a chain (not shown) through the conduit 106. The fluid 206 may be pumped using a pump 208 and into a hose 210. The hose 210 may be disposed exterior to the conduit 106 and then connected to at least one arm 212 disposed on an inner or exterior periphery of the conduit 106. The at least one arm 212 may comprise a set of nozzles 112 that may contain a first nozzle 112a and a second nozzle 112b that may dispose the fluid 206 onto the chain that passes. Any excess fluid may be received by the at least one flap 202. A reducer 214 may be disposed at the bottom of the conduit 106 to further aid in receiving the excess fluid.

Figure 3:
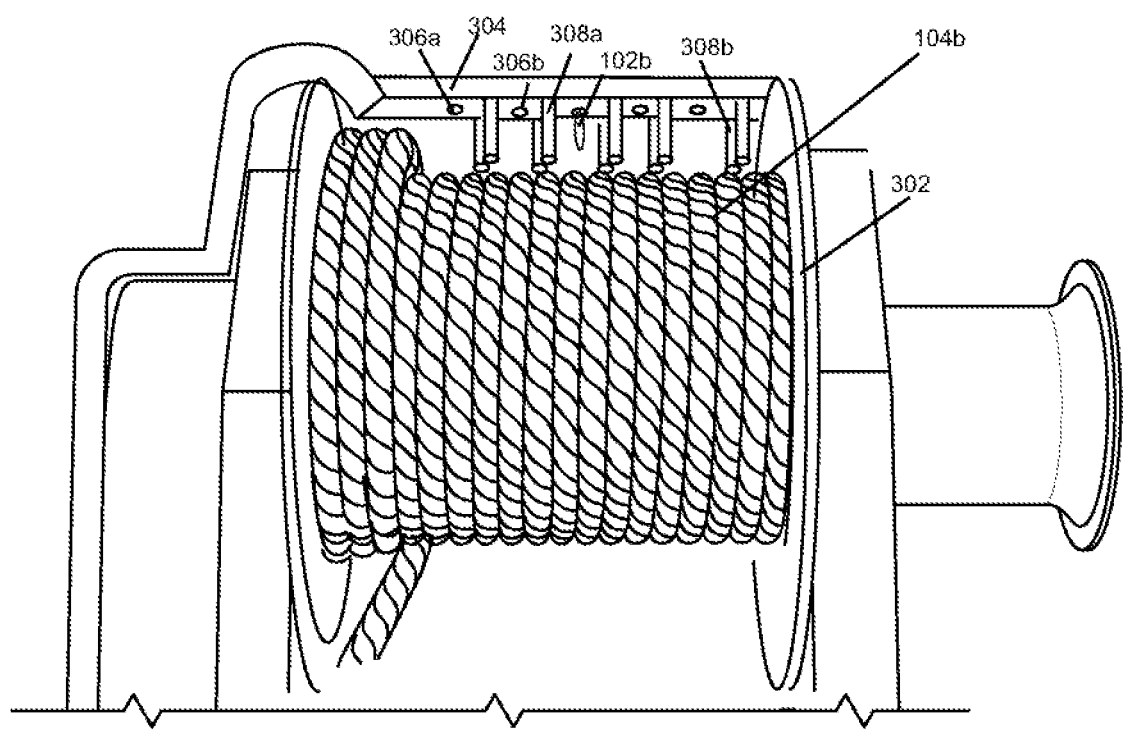
FIG. 3 is an alternative embodiment for applying a fluid to a cable.

With reference to FIG. 3, the system 300 of FIG. 3 may include a spool 302, a cable 104b, and a fluid 102b. The spool 302 may store the cable 104b such that the cable 104b may unravel from the spool 302. While the cable 104b unravels, the fluid 102b may be applied to the chain 104a in a continual manner until the cable reaches at an endpoint. The at least one arm 304 may be disposed fixedly or flexibly above and/or below the spool 302 such that the least one arm 304 provides a housing for the fluid 102b to pump and dispense/spray through the at least one set of nozzles 306. Similar to the aspect described in FIG. 1, the at least one set of nozzles 206 may be disposed on an inner periphery of the each arm 304 and each set of nozzles 306 may contain at least a first and a second nozzle 306a and 306b. Disposed between the first and second nozzle 306a and 306b, may be at least one flap 308 as previously described. Alternatively and as illustrated in FIG. 3, flaps 308a and 308b may be disposed on either edge of the arm 304 with nozzles 306 disposed on the inner periphery of the arm 304. The nozzles 306 may apply the fluid 102b at varied pressures. Example locations for the system 300 may include the deck or the hull of a ship, however other locations and uses may be suitable.

Although one arm is described herein to apply the fluid, additional arms may be used to apply the fluid 102 on to additional portions of the chain/cable 104. For example, on an alternative side of the conduit 106 an additional arm may be disposed. In another aspect, three or more arms (not shown) may extend into the conduit 106 in order to provide an application of fluid 102 throughout the circumference or perimeter of the conduit 106.

Although the aspects described herein may specifically refer to a cable or a chain, this reference is for mere convenience and the aspects may apply equally to cables, chains, and/or any type of linkages suitable for an anchor.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed:

1. A system for applying an anti-corrosion fluid to a chain or a cable comprising:
   a reservoir supplying the anti-corrosion fluid;
   a conduit oriented vertically;
   at least one set of nozzles disposed on an inner periphery of the conduit, for applying the anti-corrosion fluid to the chain or the cable;
   at least one flap disposed on the inner periphery of the conduit below the at least one set of nozzles; and
   wherein the at least one flap catches an excess fluid and smears the excess fluid onto the chain or the cable.

2. The system of claim 1, further comprising a reducer attached to a bottom end of the conduit.

3. The system of claim 2, wherein the at least one flap is coupled to the reducer.

4. The system of claim 1, further comprising: a first set of nozzles disposed on the inner periphery of the conduit, which applies fluid to the chain or the cable; a first flap disposed on the inner periphery of the conduit below the first set of nozzles; a second set of nozzles disposed on the inner periphery of the conduit below the first flap, which applies fluid to the chain or the cable; and, a second flap disposed on the inner periphery of the conduit below the second set of nozzles.

5. The system of claim 4, wherein the chain or the cable passes through the conduit that houses the first set of nozzles and the second set of nozzles and the at least one flap and the second flap, wherein each of the at least one flap and the second flap guides the chain or cable passing through the conduit.

6. The system of claim 1, wherein the at least one flap forms at least one conical shape directed towards an opening of the conduit.

7. The system of claim 1, wherein the at least one flap forms a central orifice within the conduit.

8. The system of claim 1, wherein the at least one flap forms a set of four conical shapes directed towards an opening of the conduit.

9. The system of claim 1, wherein the at least one set of nozzles are located above the at least one flap.

10. The system of claim 1, further comprising a pump pressurizing the anti-corrosion fluid for the at least one set of nozzles.

11. The system of any one of claims 1-8, wherein the anti-corrosion fluid is selected from at least one of: a penetrant, a lubricant, and a dielectric rust inhibitor.

12. A method for applying an anti-corrosion fluid to a chain or a cable comprises:
- providing a conduit oriented vertically;
- supplying the anti-corrosion fluid from a reservoir to at least one set of nozzles;
- dispensing the anti-corrosion fluid through the at least one set of nozzles disposed on an inner periphery of the conduit onto the chain or the cable; and
- passing the chain or the cable through at least one flap disposed on the inner periphery of the conduit below the at least one set of nozzles; and
- catching and smearing an excess fluid to the chain or the cable with the at least one flap.

13. The method of claim 12, further comprising: providing a reducer attached to a bottom end of the conduit; and, guiding the chain or the cable with the reducer as the chain or the cable passes through the reducer.

14. The method of claim 12, further comprises guiding the chain or the cable with the at least one flap.

15. The method of claim 14, wherein the at least one flap forms at least one conical shape directed towards an opening of the conduit.

16. The method of claim 15, wherein the at least one flap forms a central orifice within the conduit.

17. The method of claim 12, wherein the at least one flap forms a set of four conical shapes directed towards an opening of the conduit.

18. The method of claim 12, wherein the at least one set of nozzles are located above the at least one flap.

19. The method of claim 12, wherein the anti-corrosion fluid is selected from at least one of: a penetrant, a lubricant, and a dielectric rust inhibitor.

* * * * *